United States Patent [19]
Suggs et al.

[11] Patent Number: 5,729,361
[45] Date of Patent: Mar. 17, 1998

[54] COLOR SCANNER USING BOTH VARIABLE LED EXPOSURE TIME AND PHOTO DETECTOR OUTPUT COMPENSATION

[75] Inventors: Bradley N. Suggs; Ali Moayer, both of Fremont, Calif.

[73] Assignee: Logitech, Inc., Fremont, Calif.

[21] Appl. No.: 497,459

[22] Filed: Jun. 30, 1995

[51] Int. Cl.[6] .................. H04N 1/04; H04N 1/46; H04N 1/00; H01J 5/16
[52] U.S. Cl. .............. 358/505; 358/475; 358/482; 358/484; 358/509; 358/406; 250/226
[58] Field of Search .................. 358/468, 471, 358/474, 475, 482, 483, 484, 505, 509, 406; 250/226

[56] References Cited

U.S. PATENT DOCUMENTS

| | | | |
|---|---|---|---|
| 4,394,089 | 7/1983 | McIntosh et al. | 355/88 |
| 4,415,925 | 11/1983 | Tamura | 358/75 |
| 4,517,591 | 5/1985 | Nagashima et al. | 358/75 |
| 4,638,372 | 1/1987 | Leng et al. | 358/296 |
| 4,660,095 | 4/1987 | Cannella et al. | 358/294 |
| 4,731,661 | 3/1988 | Nagano | 358/75 |
| 4,833,533 | 5/1989 | Augusti et al. | 358/523 |
| 5,268,752 | 12/1993 | Fukada et al. | 358/475 |
| 5,291,307 | 3/1994 | Luckhurst | 358/474 |
| 5,365,084 | 11/1994 | Cochran et al. | 250/226 |

*Primary Examiner*—Edward L. Coles, Sr.
*Assistant Examiner*—Kimberly A. Williams
*Attorney, Agent, or Firm*—Townsend and Townsend and Crew LLP

[57] ABSTRACT

The present invention provides a combination of first providing a coarse adjustment by varying the emitter power and duration of the emitter/detector exposure time, and then providing a fine adjustment by storing a correction value for each photodetector element. The adjustment for each photodetector corrects not only for the range, but also for the offset, providing two correction values. In a preferred embodiment, the low and high voltage reference levels for an analog to digital converter are adjusted and stored for each photodetector for each color.

32 Claims, 5 Drawing Sheets

COLOR SCANNER USING BOTH VARIABLE LED EXPOSURE TIME AND PHOTO DETECTOR OUTPUT COMPENSATION

BACKGROUND OF THE INVENTION

The present invention relates to color image sensor devices such as image scanners, facsimile machines and copy machines, and in particular relates to compensating for varying light emitter output flux and sensor responsivity.

Many different types of devices exist for sensing color images. These can be desktop or hand held scanners, copy machines, facsimile machines, or other devices. A number of different methods are used. In one, a fluorescent lamp is used to illuminate the image, with different color filters being positioned to intercept either the transmitted or reflected light before it is sensed. Alternately, multiple fluorescent lamps with their own dedicated filters used for emitting different colors of light could be used. In yet other devices, instead of fluorescent lamps, light-emitting diodes (LEDs) are used, with different LEDs having different color emissions. For example, a typical configuration might have three types of LEDs, one in the blue range of wavelengths, another in the green range of wavelengths, and another in the red range of wavelengths.

One problem with using LEDs is that the radiant flux of light emitted, and even the mean wavelength of light emitted, for different LEDs of the same color may vary from LED to LED depending on the manufacturing process. Because the particular color of the image is reconstructed from the combination of the values received from the three different colors reflected, variations can not only cause errors, but can cause amplified errors if there are variations in different directions between a green and blue LED, for instance. Another problem with devices of this type is that the photodetectors themselves have different responsivities depending upon the wavelength of light received. Thus, for the same radiant flux of light reflected for two different colors, the photosensor would provide an output which indicates a difference in value and thus induce an error in the color of the image detected.

FIG. 4 illustrates this effect for three different LED types. FIG. 4 is a graph of wavelength along the horizontal axis and relative spectral response along the vertical axis. A solid line 28 indicates the sensor responsivity of the photosensor. As can be seen, this varies depending upon the wavelength, with lower responsivity for lower wavelengths. Superimposed is an illustration of the wavelength distribution for LEDs of three particular color designations. Any individual LED will emit many different wavelengths of light whose radiant flux is roughly in accordance with the distribution indicated. As can be calculated using the photopic response function 26, a first LED type 20 (blue) has a relative spectral power distribution where, for the same integrated luminous flux as provided in the relative spectral power distribution of a second LED type 22 (green), the photosensor would provide an output for the first type that is roughly three times that of the second type. Similarly, a third LED type 24 (red) has a relative spectral power distribution where, for the same integrated luminous flux as provided in the relative spectral power distribution of a second LED type 22 (green), the photosensor would provide an output for the third type that is roughly 12 times that of the second type.

Another effect is illustrated in FIG. 5 showing the luminous flux output as a function of electrical power for three different LED types. A first LED type 1-1, labelled 20 (blue) has a much lower output luminous flux that the other two LED types. LED type 1-2, labelled 22 (green) has nearly the same luminous output flux as LED type 1-3, labelled 24 (red/orange). Accordingly, in addition to the photosensor having different spectral responses, the output of the LEDs themselves will vary for the same amount of power applied to the LEDs.

There have been basically two approaches to compensating for the above identified effects. In a first method, such as set forth in Sharp U.S. Pat. No. 4,731,661, compensation is achieved by varying the amount of time the different light emitters are on. In the Sharp patent, three different fluorescent tubes are used for three different colors. The amount of time each is on is varied to compensate for varying spectral response of the photosensors. The photosensors typically used respond to sensed light with an output voltage which is an integration function of the received light. Thus, the longer the light is on, the higher the photosensor output. Thus, having a longer on-time for a wavelength to which the photosensor is less sensitive will compensate for the lesser sensitivity.

Another example of how compensation is done is set forth in U.S. Pat. No. 5,268,752. In this patent, LEDs of different colors are used. For each LED, the output of the detector is compensated for with a compensator circuit.

U.S. Pat. No. 4,833,533 sets forth in more detail how a compensation of the photosensor output can be done. In the '533 patent, a sample strip is read with a sensor, and a value is stored for each pixel for each color. In other words, the compensation is applied on a pixel by pixel basis and on a color by color basis for each pixel. This compensation value is stored in the memory, and then used to calculate a compensating ratio which is applied when the scanner is used to read an image.

SUMMARY OF THE INVENTION

The present invention provides a combination of first providing a coarse adjustment by varying both the power provided to the emitters and the duration of the emitter/detector exposure time, and then providing a fine adjustment by storing a correction value for each photodetector element. The adjustment for each photodetector corrects not only for the range, but also for the offset, providing two correction values. In a preferred embodiment, the low and high voltage reference levels for an analog to digital converter are adjusted from values stored for each photodetector for each color to produce corrected digital outputs.

In a preferred embodiment, the adjustment is done by scanning a pair of test strips using the varying LED powers and exposure times which provide the coarse adjustment. One test strip is a light gray, and the other is a dark gray. The values for these samples are then determined, and offset and range corrections are calculated. The calculated corrections are extrapolations corresponding to white and black values at the end of the range, but are not measured in this way to avoid clipping effects at range extremes, and are applied as appropriate references to obtain corrected digital outputs.

In another aspect of the invention, the LEDs are arranged in an interleaved fashion, with multiple colors being in the same row. The timing is varied by varying the on-time of the LEDs, with blue LEDs being on longer than the green and red colors, which are on the same, shorter period of time. The periods of time are chosen by determining the minimum amount of time the green and red LEDs can be on and still match the photosensor output for blue, with the blue LEDs being turned on to the maximum power for the maximum amount of time available to achieve the desired scanning rate.

For a fuller understanding of the nature and advantages of the invention, reference should be made to the ensuing detailed description taken in conjunction with the company drawings.

DETAILED DESCRIPTION OF THE PREFERRED EMBODIMENTS

Figure 1:
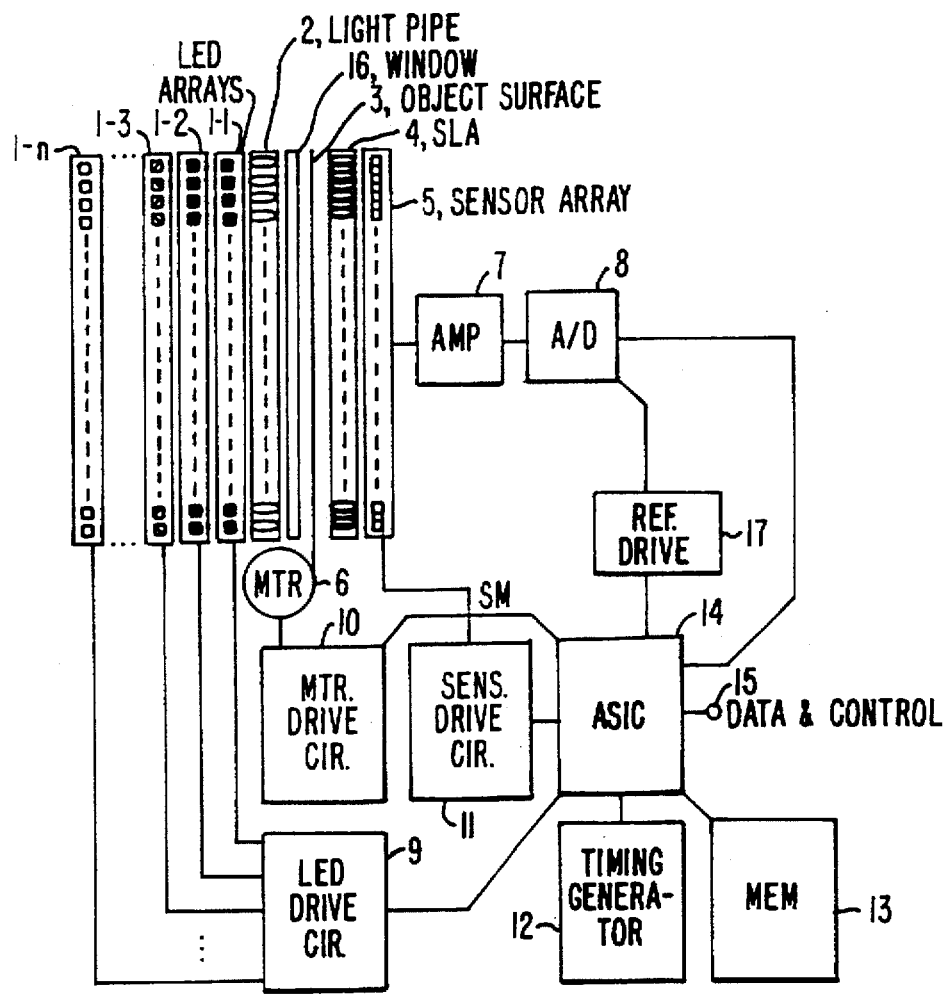
FIG. 1 is a block diagram of the electronics of a scanner according to the present invention.
Figure 2A:
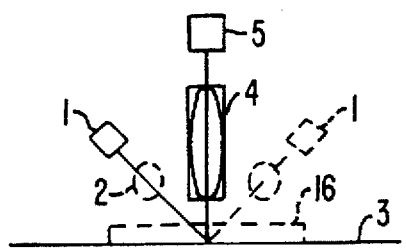
FIGS. 2A and 2B illustrate several possible arrangements of the optical elements of the present invention.
Figure 2B:
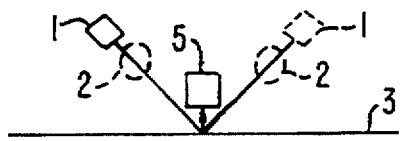

FIG. 1 is a system diagram of one embodiment of the invention. A plurality of LED arrays (1-1 to 1-n in FIG. 1) emit light of different spectra and are driven by a LED drive circuit 9. A surface presenting a visible object 3, for example, a manuscript, a drawing, a figure, a photograph, and the like (hereinafter referred to as the object surface), is illuminated with the light emitted from the LED arrays in a substantially linear manner. The light emitted from the LED arrays may be redirected, and/or concentrated, and/or homogenized by an optional optical element 2 (hereinafter referred to as the light pipe) before irradiating the object surface through an optional transparent window 16. Light reflected from this object surface enters a linear array of photosensitive elements 5 after passing through the transparent window again (if present), and either after passing through a self-focusing lens array 4 (hereinafter referred to as the S.L.A.), as in the case of a normal contact-type image sensor, as shown in FIG. 2A; or without passing through a S.L.A., as in the case of a complete contact-type image sensor, as shown in FIG. 2B. The LED arrays may be situated on either one side or both sides of the sensor array as indicated in FIG. 2.

The timing generator 12 provides the basic clock frequency ($f_o$) to the ASIC 14 for use in synchronizing all operations for the device. The LED drive circuit 9 provides the appropriate power levels to the LED arrays (1-1 to 1-n) in response to the timing signals (SL-1 to SL-n) from the ASIC 14. For each line of the document, each of LED arrays 1-1 through 1-n are activated in sequence before moving on to the next line. An entire array of a particular color will be activated at one time to produce a line of light rather than being individually activated. Although shown in a linear array in FIG. 1, alternate embodiments may be preferable as discussed below with respect to FIG. 3.

The motor drive circuit 10 produces the energizing signal required by the motor 6 to accomplish sub-scanning of the manuscript 3 in response to the motor drive signal (SM) from the ASIC 14. For the motor, a rotary stepper type could be employed most advantageously, though a linear stepper type or other type capable of discrete motion may also be utilized. The motor either moves the scanner across the paper, or the paper across the scanner. It is moved one step or line at a time, with each of the LED arrays being activated before the next move.

The sensor drive circuit 11 converts the timing signals (SI and CLK) from the ASIC 14 into the impulses necessary for the sensor array 5 to accomplish the main scanning operation. In particular, this clocks the data out of the photosensors and, if a shift register output is used, shifts the data out to amplifier 7. The amplifier 7 applies a consistent bias voltage (optionally zero) and a consistent gain factor (optionally unity or even non-linear) to the output voltages (SO) from the sensor array so as to bring them within the range of the analog-to-digital (A/D) converter 8. The output of the A/D converter 8 is provided to ASIC 14, where it may be stored in memory or provided over an output port of the scanner. Memory 13 stores correction factors for the photosensor, and in the preferred embodiment discussed below, these are applied through a reference drive 17 to set the low (offset) and high (offset plus range) voltage reference values of a A/D converter 8 for each particular photosensor pixel for each color.

The ASIC 14 of FIG. 1 is synchronized by the timing generator 12 to access the memory 13 and provide signals to all of the driving circuitry (9, 10, 11, and 17) in addition to communication of control and data signals on a port 15 to a host computer for any of the purposes of further image processing, display, printing, modem transfer, or facsimile transmission. The ASIC may additionally be tasked to perform such operations as controlling the device in a manner to obtain grayscale or binary image representations and/or providing alternative output data representations (e.g., data formatting and/or data compression/encoding and/or color space conversion).

As shown in FIG. 2A, the LED array is arranged at a 45° angle to the photosensor array 5. The LEDs can be on one side or on both sides, with the arrangement on both sides doubling the intensity of light, at the cost of adding additional components. A 45° angle is used rather than a direct reflective 90° angle in order to provide a more diffuse reflection, which is especially important when reading glossy paper. As shown in FIG. 2B, the SLA of 4 of FIG. 2A can be eliminated in one embodiment.

Figure 3:
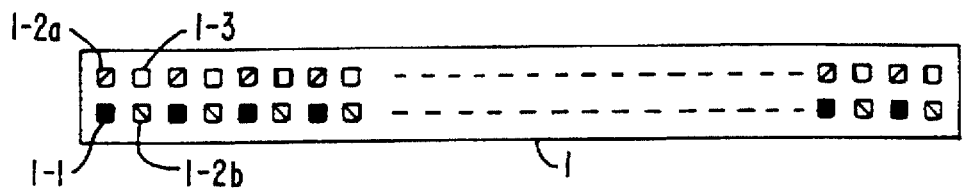
FIG. 3 is a diagram of an embodiment of an LED layout according to the invention.
Figure 4:
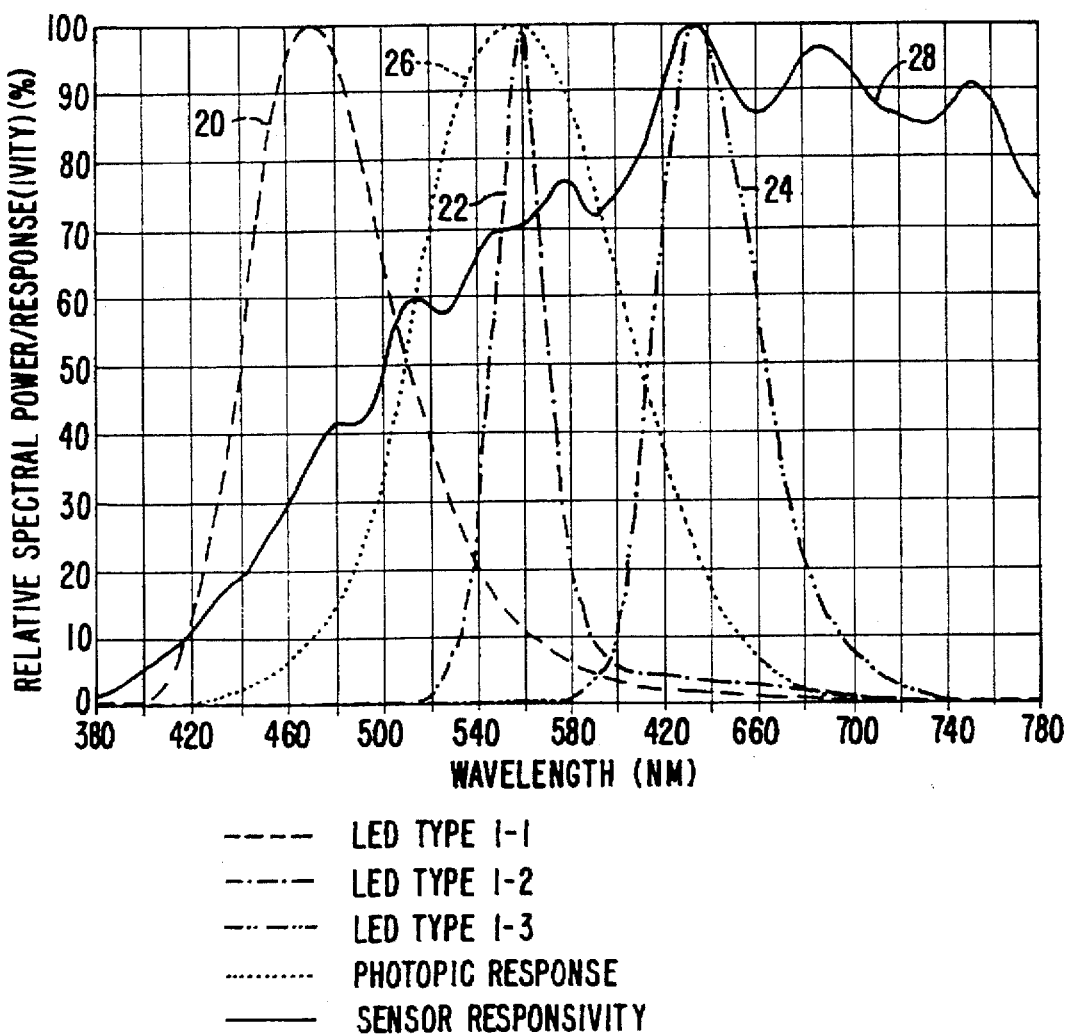
FIG. 4 is a graph of the sensor spectral responsivity, the photopic response function, and relative spectral powers of sample LEDs.

FIG. 3 shows an example of the arrangement and composition of the LED arrays. This example demonstrates that co-linearity is not essential, nor is the number of LED types in an array limited to one. However, in the simplest case, as few as three types would be arranged linearly so that the arrays would be interlaced in an approximately evenly and closely spaced repeating pattern. This would allow the arrays to be located in close proximity to the object surface so that the object surface could be sufficiently and more uniformly illuminated from each array either without using a light pipe 2, or by using a light pipe of decreased cost and complexity.

As shown in FIG. 3, four different colors could be interleaved, colors indicated by 1-1, 1-2a, 1-2b, and 1-3. Alternately, one of the locations, such as 1-2b, could be left unused, such as where the LEDs come in a three per package die, arranged in an L-shape where the common connection completes the square. In yet another embodiment, the reduced luminous flux of the blue LEDs could be addressed by doubling the amount of blue LEDs compared to the other LEDs. Thus, for instance, the 1-2a and 1-2b LED positions in FIG. 3 could both be blue LEDs.

Figure 6A:
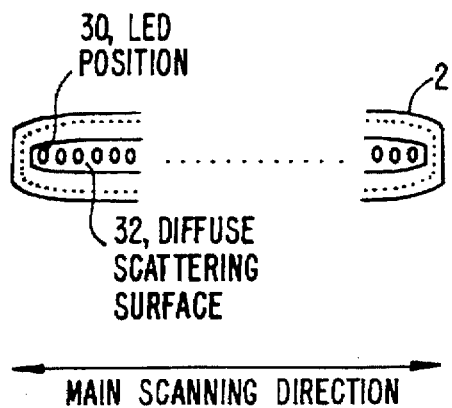
FIG. 6A and 6B are diagrams of a light pipe used in an embodiment of the present invention.
Figure 6B:
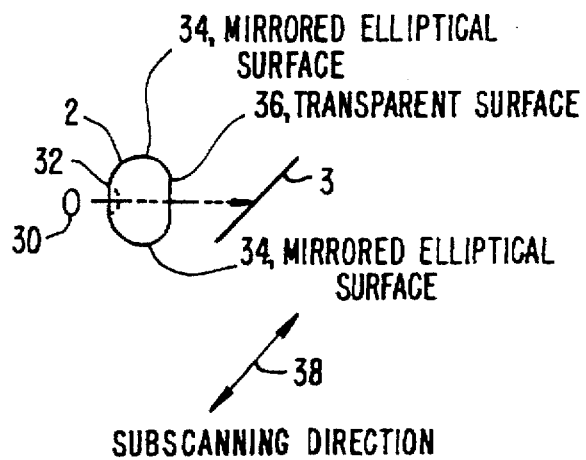

FIGS. 6A and 6B show an example of a light pipe 2, whose purpose is to concentrate the light from the arrays in the sub-scanning direction (perpendicular to the line of sensors in the sensor array) while minimizing the variation in the amount of illumination in the main scanning direction (parallel to the line of sensors in the sensor array). Such a device may prove cost effective in reducing the number of LEDs required to provide sufficient illumination to the object surface 3. As can be seen in FIG. 6A, the light pipe is positioned over a number of LED positions 30. The center portion 32 of the light pipe has a diffuse scattering surface for spreading out the light from the LEDs.

FIG. 6B shows a cross-sectional view of light pipe 2 of FIG. 6A. The light from the LED 30 is passed through a diffuse scattering surface 32. A mirrored elliptical surface 34 is provided on the top and bottom of the light pipe. The far side 36 is a transparent surface through which the light passes to impact upon object surface 3 being scanned. Note that in FIG. 6B, the object surface is shown at an angle so that the light pipe can be observed with the light path horizontal. The sub-scanning direction in which the scanner moves is indicated by arrows 38. As can be seen, light is diffused upon passing through surface 32, and any light spreading at too wide an angle is reflected back by surfaces 34. The light pipe thus evens out the distribution of light from LEDs which are separated so that the portions in between the LEDs are illuminated with an intensity closer to that of portions directly below the LEDs. The remaining amount of compensation is done by the correction at the photosensors on reading a test strip as discussed below.

Figure 7:
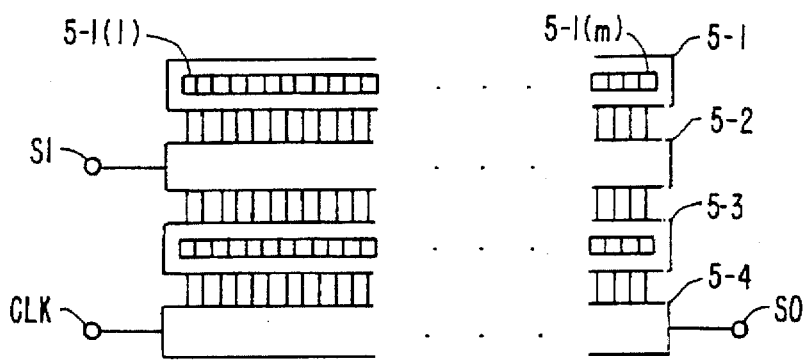
FIG. 7 is a diagram of the different elements of the photosensor circuitry.

FIG. 7 shows a functional block diagram of the sensor array 5. This sensor array consists of a linear array of a plurality of (number m) photosensitive elements (5-1), a separate corresponding array of storage elements (5-3), a means (5-2) of simultaneously causing the transfer of the sensed responses, optionally transformed, from all of the photosensitive elements to their corresponding storage elements, and a means (5-4) of sequentially causing the read-out of the individual response (optionally transformed) maintained in each storage element as a voltage functionally related to the integrated incident illumination. In operation, the input signal SI activates the means 5-2 to accomplish the transfer to storage, and the input signal CLK activates the means 5-4 to accomplish the read-out as a series of output voltages SO. In one example, 5-4 is a shift register which serially shifts out to output SO the parallel inputs from storage elements 5-3.

Figure 8:
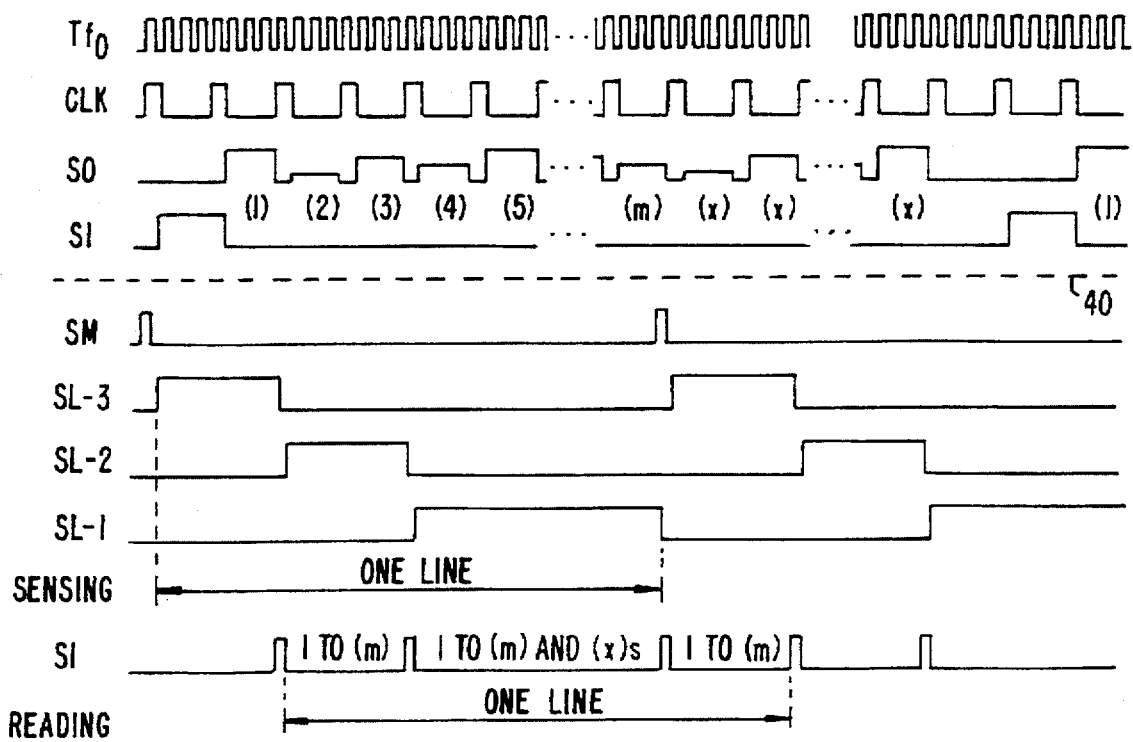
FIG. 8 is a timing diagram illustrating the varying on-times of the LEDs according to the present invention.

FIG. 8 is a timing diagram showing the general relationship between some signals generated by the ASIC (14 in FIG. 1) from some multiple, T, of the basic clock frequency ($f_o$) provided by the timing generator (12 in FIG. 1). These signals are SL-1, SL-2, and SL-3 for the LED drive circuit (9 in FIG. 1); SM for the motor drive circuit (10 in FIG. 1); and SI and CLK for the sensor drive circuit (11 in FIG. 1). This diagram shows the timing for three LED arrays, though the extension to more is straightforward. This diagram also shows the case where two of the color component sensing durations are equal to the duration required for read-out, although this is not essential. A portion of the timing below the dotted line 40 in FIG. 8 (representing the reading of more than the first line of the object surface) is expanded above the dotted line (representing only a little over the duration of one color component reading).

Between each advance of the motor (SM), each of the three LED arrays are illuminated (SL-3, SL-2, SL-1). After the first LED array is illuminated (SL-3), a signal SI causes the read-out of the data, while the next color is being sensed. The SO signal above dotted line 40 illustrates a series of read-out values for all the photosensors for the SL-3 color. Since a minimum amount of time is required for this read-out, this is the minimum time the LED arrays are on. The LED array that is on for longer (i.e., blue) extends the signal SI. One effect is that the readout for the previous color is completed before the next SI signal. To account for this, dummy counts (x) are dropped from the SO signal to make up the difference.

Figure 5:
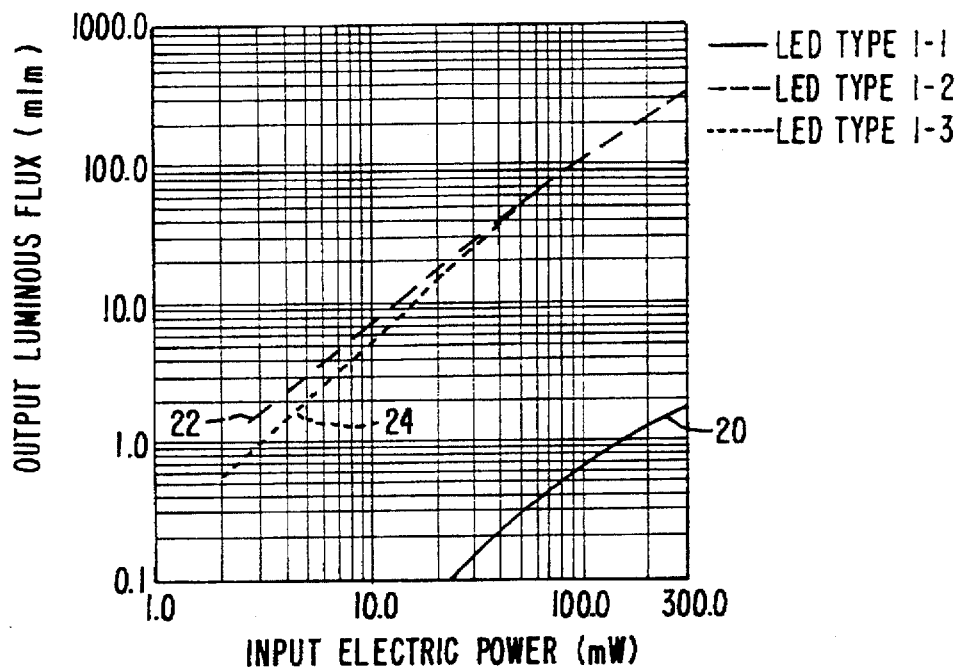
FIG. 5 is a graph of the luminous fluxes of different LEDs.

Referring again to FIG. 5, the present invention matches the photosensor outputs for the three LED types and photosensor combination. This is done by requiring integrated luminous fluxes for red to green to blue roughly in the ratio (1/12) to 1 to (1/3) with the same exposure time, or (1/12) to 1 to (1/6) with blue having an exposure time twice that of red and green. This can be accomplished by providing power to the LED types of red, green, and blue as 2.5 mW, 10.25 mW, and 250 mW, respectively, which result in output luminous fluxes of 0.75 mlm, 9 mlm, and 1.5 mlm, respectively, as indicated in FIG. 5 by points labelled 42, 44, and 46, respectively. Thus, the blue LEDs are provided more than 10 times the power of the red LEDs, preferably 100 times the power in the example given. As can be seen, the power provided to the red LED is barely sufficient for its activation, while the power provided to the blue LED is barely below its maximum capability. This is to avoid requiring the use of a different amplifier gain for each color to accomplish this match, but allow the potential use of such a different amplifier gain to control the relative noise level between colors to account for the human visual response.

A high noise level for blue light is less objectionable than a high noise level for green light, for instance. The power provided to the blue LEDs is at least 50% of the maximum DC rating, preferably greater than the DC rating but no more than the maximum pulsed rating for the duty cycle used. This higher level can be used because the scanner is programmed not to stop with the LEDs on. One advantage of using different timing as in the present invention, rather than different amplification, is that the signal-to-noise ratio is improved, in particular for the blue light.

Figure 9:
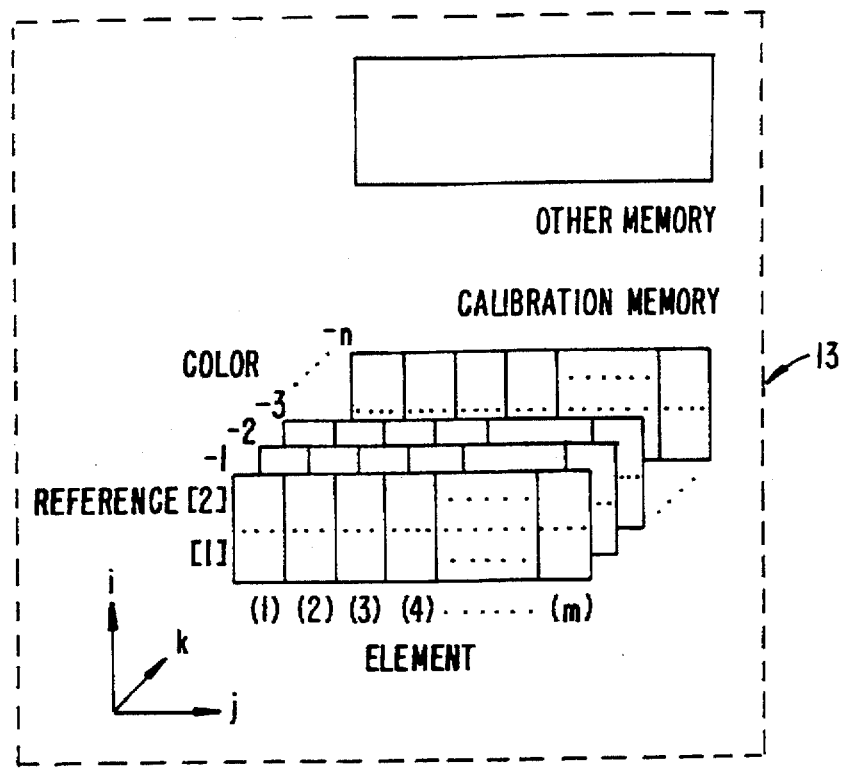
FIG. 9 is a descriptive diagram of the contents of the calibration memory.

FIG. 9 illustrates a descriptive, but not literal, organization of the memory 13 of FIG. 1. This memory may be DRAM, VRAM or other type that may be written infrequently yet accessed quickly and repeatedly. The dimension "i" represents which A/D reference, "j" represents which element position, and "k" represents which color component. Entries in the calibration memory are digital code values that are circularly and sequentially accessed along the "i" direction within circular and sequential accesses along the "j" direction within circular and sequential accesses along the "k" direction by the ASIC 14. Other memory locations may be utilized for compensated data intermediate storage and/or data output buffering. The ASIC then provides two digital codes to the reference drive 17 of FIG. 1, one to adjust the low reference of the A/D (Vref−) and one to adjust the high reference of the A/D (Vref+). Both entries in the "i" direction may actually reside in the memory 13 as a single entry which the ASIC 14 would then parse prior to presentation to the reference drive 17. The reference drive 17 of FIG. 1 can be conveniently thought of as two digital to analog converters (D/As), though implementation as two resistor to resistor networks (R/Rs) would likely be more practical.

Figure 10:
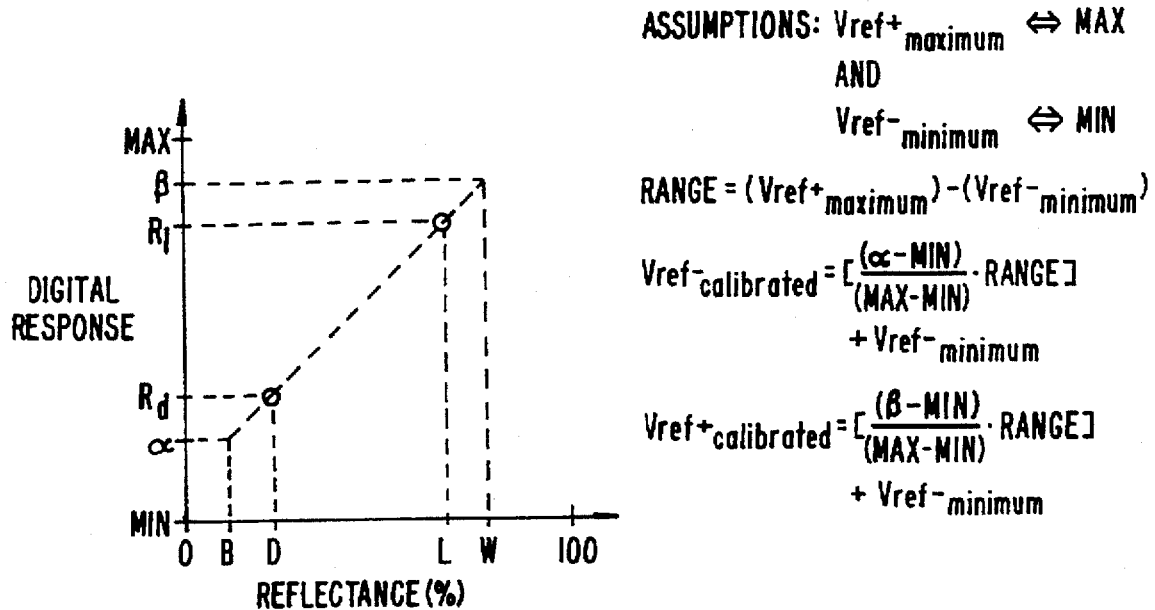
FIG. 10 is a graph illustrating the calculation of the A/D reference voltage adjustments.

Entries in the calibration memory would be stored following their determination during an initialization process that may occur either only once or occasionally. This initialization process requires the reading of two uniform, spectrally non-selective, neutral gray targets, one a dark gray shade of reflectance D and the other a light gray shade of reflectance L with the calibration memory first set to provide the maximum range between Vref− and Vref+ that will be used. A plurality of lines of each shade are read and averaged to obtain average values ($R_d$ and $R_l$) representative of each shade for each element for each color component. Extrapolation of these measured average values ($\alpha$ and $\beta$) is used in the determination of the calibration memory entries as depicted in the graph of FIG. 10, where only one color component of one element is considered. For the purpose of clarity, FIG. 10 assumes a linear relationship between target reflectance and device response as well as a desired reflectance range from a black B through a white W (different from zero and one hundred percent respectively) to be represented in the final data as the minimum digital output value MIN and the maximum digital output value MAX, respectively. The reason for this extrapolation, rather than actually using targets of the black and white values, is to avoid the influence on the calculated averages of potential clipping for the accuracy required. The entries in the calibration memory would be digital values coded to elicit the desired calibrated low and high reference voltages (Vref−$_{calibrated}$ and Vref+$_{calibrated}$, respectively) from the reference drive 17.

The A/D converter may be of the type commonly known as a flash A/D, but, in any event, should possess a low reference level (Vref−) and a high reference level (Vref+) for mapping associated analog voltage inputs to the extremes of the digital output range, where these references may each be adjusted to anywhere within a certain range corresponding to that reference and still allow the conversion to occur.

Alternative embodiments to those shown are possible. The functional block diagram of FIG. 1 is not meant to imply separate components for the indicated functions (e.g., the amplifier 7 may be included within the same component as the sensor array 5).

In FIG. 2A, if one were to envision the optical layout as being rotationally symmetric about the vertical axis, one would arrive at an alternative embodiment. The LED arrays 1 and light pipe 2 would be annular, the S.L.A. 4 could be replaced by a simple lens while the sensor array 5 would be an area array of limited field of view rather than a linear array. There would be two motors; one for controlling the movement in the sub-scanning direction, and the other for controlling stepping in what was the main scanning direction with the effect that these motors would be moving the optical sensing subsystem relative to the manuscript. The sensor array might be a frame-transfer type area CCD, CMOS area sensor, or other photosensing area array with an associated storage section. In this embodiment, the host computer would additionally be tasked with compositing these vignettes to form an image of the manuscript, but the ASIC 14 could transmit the data to the computer more efficiently by performing a variety of two-dimensional compression on the data (e.g., JPEG) without requiring substantial excess storage memory. A raster scanning operation of this area sensor array for one color component may be done. In other aspects, this alternative embodiment is substantially the same as the preferred one.

The variability in the sensitivity to light of the individual elements in the array for contact-type image sensors is well known and several means of ameliorating this variability have been devised. One method allows light integration times to be varied for each element. This technique cannot directly be applied in the present case where the sensing for one color component for all elements in a complete line occurs simultaneously.

Another method addresses the issue by indexing a compensated proportional output value from both the digitized input value and the identified element. This technique effectively remaps the range of the data, but continues to suffer from the non-optimal initial quantization. The present invention adjusts, on an element by color component basis, one A/D reference level (the high one for offset plus range) in order to compensate for the previously determined combined spatial variations of light output, light transmission, and sensitivity of the element occupying each respective location for each color component. The present invention adjusts the other A/D reference level (the low one for offset) in order to compensate for previously determined spatial variations of dark response on an element by color component basis. This latter adjustment on a color component basis even for the same element ostensibly compensates for the dark response being a function of the respective integration time (which is different for at least one of the color components of the present invention), though it also can have a beneficial effect in masking other line-time stationary noise sources. This technique more optimally quantizes the desired signal.

As will be understood by those familiar with the art, the present invention may be embodied in other specific forms without departing from the spirit or essential characteristics thereof. For example, different numbers of colors or a different arrangement of the LED arrays could be used. Alternately, the on time of the photosensors could be varied rather than varying the on time of the LEDs. Each group of LEDs could contain LEDs of different colors, producing a combined color (as long as there are three different combined colors). Alternately, other methods of correcting both the offset and the gain could be used rather than the specific example of the low and high reference voltage for an A/D converter. Accordingly, the disclosure of the preferred embodiments of the invention is intended to be illustrative, but not limiting, of the scope of the invention which is set forth in the following claims.

What is claimed is:

1. A color image scanner for reading a document, comprising:

an array of light emitters in at least three groups, each group having a plurality of emitters of at least one color;

a plurality of light detectors;

a converter configured to convert a sensed exposure of each of said light detectors for each of said light emitter groups into a digital value;

a timer configured to vary the sensed exposures of all of said light detectors to each of said light emitter groups in accordance with the emitter color or colors within each group for at least one activation of light emitter groups;

an initialization unit configured to measure a variation in a sensed exposure using a test target for each of said light detectors for each of said light emitter groups;

a calibration memory for storing an adjustment value corresponding to said variation for each of said light detectors for each of said light emitter groups; and an initialization adjuster configured to adjust said digital value for each of said light detectors with said adjustment value in said memory.

2. The scanner of claim 1 wherein said timer varies the time said light emitters are on.

3. The scanner of claim 1 wherein said timer varies the time said light detectors are on.

4. The scanner of claim 1 wherein said converter is an analog-to-digital converter and said adjustment value comprises a high and low voltage reference for said analog-to-digital converter.

5. The scanner of claim 1 wherein said light emitters have at least three different colors, and wherein said timer activates light emitters of a first color for a first period of time, and activates light emitters of second and third colors for a second, shorter period of time.

6. The scanner of claim 5 wherein said first period of time is at least twice said second period of time.

7. The scanner of claim 1 wherein each of said groups of emitters is a single color.

8. The scanner of claim 7 further comprising a power source configured to vary an amount of power provided to each of said groups of light emitters in accordance with a color of said group.

9. The color scanner of claim 8 wherein the amount of power provided to a first group having the shortest wavelength is at least 50% of the maximum DC power rating for said emitters of said first group.

10. The color scanner of claim 9 wherein the amount of power provided to said first group is greater than the maximum DC power rating and no more than the maximum pulsed power rating for said light emitters of said first group for a given duty cycle.

11. The color scanner of claim 8 wherein the power applied to a first group having the longest wavelength is less than $1/10$ of the power applied to a second group having the shortest wavelength.

12. The color scanner of claim 1 wherein at least two of said groups of emitters are arranged in a single line.

13. The scanner of claim 1 wherein a first group of said light emitters of a first color is larger than a second group of said light emitters of a second color.

14. A color image scanner for reading a document, comprising:

an array of light emitters having a plurality of emitters for each of at least three colors;

a plurality of light detectors;

an analog-to-digital converter coupled to said light detectors for converting a voltage level representing a sensed color exposure into a digital value; and a timer configured to vary the time light is emitted by said light emitters and detected by said light detectors in accordance with the color of said light emitters, wherein said timer activates light emitters of a first color for a first period of time, and activates light emitters of second and third colors for a second, shorter period of time;

wherein the amount of power provided to the light emitters having the shortest wavelength is at least 50% of the maximum DC power rating for said emitters of.

15. The color scanner of claim 14 wherein the amount of power provided to said first group is greater than the maximum DC power rating and no more than the maximum pulsed power rating for said light emitters of said first group for a given duty cycle.

16. A color image scanner for reading a document, comprising:

an array of light emitters having a plurality of emitters for each of at least three colors;

a plurality of light detectors;

an analog-to-digital converter coupled to said light detectors for converting a voltage level representing a sensed color exposure into a digital value; and a timer configured to vary the time light is emitted by said light emitters and detected by said light detectors in accordance with the color of said light emitters, wherein said timer activates light emitters of a first color for a first period of time, and activates light emitters of second and third colors for a second, shorter period of time;

wherein the power applied to said light emitters having the longest wavelength is less than $1/10$ of the power applied to said light emitters having the shortest wavelength.

17. A color image scanner for reading a document, comprising:

an array of light emitters having a plurality of emitters for each of a plurality of colors, said light emitters being mounted in said scanner to illuminate said document;

a plurality of light detectors;

an analog-to-digital converter coupled to said light detectors for converting a voltage level representing a sensed color exposure into a digital value;

an initialization unit configured to measure a variation in a sensed color exposure for each of said light detectors for each of said colors;

a calibration memory for storing an offset adjustment for said analog-to-digital converter corresponding to said variation for each of said light detectors for each of said colors;

an offset adjustment input configured to apply said offset adjustment from said memory to said analog-to-digital converter for each of said light detectors for each of said colors.

18. The scanner of claim 17 wherein said calibration memory stores a range for said analog-to-digital converter corresponding to said variation for each of said light detectors for each of said colors.

19. The scanner of claim 17 further comprising:

a first group of light emitters having a first color and a first number of light emitters; and a second group of light emitters having a second color and a second number of light emitters different from said first number of light emitters.

20. A method for operating a color image scanner for reading a document, said scanner having an array of light emitters in at least three groups, each group having a plurality of emitters of at least one color, said scanner also having a plurality of light detectors, said method comprising the steps of:

converting a sensed exposure of each of said light detectors for each of said light emitter groups into a digital value;

varying the sensed exposure times of all of said light detectors to each of said light emitter groups in accordance with the emitter color within each group for at least one activation sequence of said light emitter groups;

measuring an initialization variation in a sensed exposure for each of said light detectors for each of said light emitter groups;

storing in a calibration memory an adjustment value corresponding to said variation for each of said light detectors for each of said light emitter groups; and adjusting said digital value for each of said light detectors with said adjustment value.

21. The method of claim 20 wherein said step of varying the sensed exposures comprises varying the time said light detectors are on.

22. The method of claim 20 wherein converting step uses an analog-to-digital converter and said adjusting step comprises adjusting a high and low voltage reference for said analog-to-digital converter.

23. The method of claim 20 wherein said light emitters have at least three different colors, and wherein said step of varying the sensed exposures comprises activating light emitters of a first color for a first period of time, and activating light emitters of second and third colors for a second, shorter period of time.

24. The method of claim 23 wherein said first period of time is at least twice said second period of time.

25. The method of claim 20 wherein each of said groups of emitters is a single color.

26. The method of claim 20 further comprising the step of varying an amount of power provided to each of said groups of light emitters in accordance with a color of said group.

27. The method of claim 26 wherein the amount of power provided to a first group having the shortest wavelength is at least 50% of the maximum DC power rating for said emitters of said first group.

28. The method of claim 27 wherein the amount of power provided to said first group is greater than the maximum DC power rating and no more than the maximum pulsed power rating for said light emitters of said first group for a given duty cycle.

29. The method of claim 26 wherein the power applied to a first group having the longest wavelength is less than 1/10 of the power applied to a second group having the shortest wavelength.

30. The method of claim 20 wherein said step of varying the sensed exposures comprises varying the time said light emitters are on.

31. The method of claim 20 wherein a first of said groups of light emitters has a first color and a first number of light emitters, and second of said groups of light emitters has a second color and a second number of light emitters, different from said first number of light emitters.

32. A color image scanner for reading a document, comprising:

an array of light emitters in at least three groups, each group having a plurality of emitters of a single color;

a plurality of light detectors;

a converter configured to convert a sensed exposure of each of said light detectors for each of said light emitter groups into a digital value;

a timer configured to vary the sensed exposures of all of said light detectors to each of said light emitter groups in accordance with the emitter color within each group for at least one activation of light emitter groups;

an initialization unit configured to measure a variation in a sensed exposure using a test target for each of said light detectors for each of said light emitter groups;

a calibration memory for storing an adjustment value corresponding to said variation for each of said light detectors for each of said light emitter groups;

an initialization adjuster configured to adjust said digital value for each of said light detectors with said adjustment value in said memory; and a power source configured to vary an amount of power provided to each of said groups of light emitters in accordance with a color of said group.

* * * * *